(12) United States Patent
Teichtmann

(10) Patent No.: US 8,134,789 B2
(45) Date of Patent: Mar. 13, 2012

(54) HOLDER FOR OPTICAL COMPONENTS

(75) Inventor: Elmar Teichtmann, Eppingen (DE)

(73) Assignee: Karl Storz GmbH & Co. KG (DE)

( * ) Notice: Subject to any disclaimer, the term of this patent is extended or adjusted under 35 U.S.C. 154(b) by 0 days.

(21) Appl. No.: 12/705,315

(22) Filed: Feb. 12, 2010

(65) Prior Publication Data
US 2010/0246032 A1    Sep. 30, 2010

(30) Foreign Application Priority Data

Feb. 14, 2009  (DE) .......................... 10 2009 008 982

(51) Int. Cl.
*G02B 7/20* (2006.01)
(52) U.S. Cl. .......................... 359/811; 359/822; 359/819
(58) Field of Classification Search .......... 359/694–704, 359/811–824
See application file for complete search history.

(56) References Cited

U.S. PATENT DOCUMENTS

| | | | | |
|---|---|---|---|---|
| 5,313,333 | A | 5/1994 | O'Brien et al. | 359/820 |
| 6,574,055 | B1 | 6/2003 | Stallard | 359/820 |
| 7,236,310 | B2 * | 6/2007 | Weber et al. | 359/694 |
| 7,426,325 | B2 * | 9/2008 | Scerbak et al. | 385/31 |

FOREIGN PATENT DOCUMENTS

| | | |
|---|---|---|
| DE | 3116579 A1 | 6/1982 |
| DE | 102005018766 A1 | 11/2006 |
| DE | 102007014155 A1 | 9/2008 |
| JP | 8179181 A | 7/1996 |
| JP | 2000292620 A | 10/2000 |
| JP | 2004117839 A | 4/2004 |

OTHER PUBLICATIONS

German Search Report; Application No. 10 2009 008 982.9; Feb. 14, 2009; 4 pages.
European Search Report; Application No. EP 10 00 1134; Mar. 10, 2010; 6 pages.

* cited by examiner

*Primary Examiner* — Mohammed Hasan
(74) *Attorney, Agent, or Firm* — St. Onge Steward Johnston & Reens LLC

(57) ABSTRACT

A holder for optical components includes a two-part holder housing that forms an essentially ring-shaped enclosure surrounding an optical component; in addition the two housing parts have different thermal expansion coefficients. To create a holder for optical components that is both simple in structure and ensures a low-tension and insulated enclosure of the optical component, it is proposed with the invention that one housing part should be configured as a ring that surrounds the optical component and on whose housing interior close to the optical component a groove should be configured that surrounds and encloses the optical component and serves as a receptacle for the second housing part, which is configured as a tension ring.

7 Claims, 3 Drawing Sheets

HOLDER FOR OPTICAL COMPONENTS

CROSS-REFERENCE TO RELATED APPLICATIONS

The present application claims priority of German patent application No. 10 2009 008 982.9 filed on Feb. 14, 2009.

FIELD OF THE INVENTION

The invention relates to a holder for optical components, with a two-part holder housing that forms an essentially ring-shaped enclosure for an optical component; in addition, the two housing parts have different thermal expansion coefficients.

BACKGROUND OF THE INVENTION

Holders for optical components are known in the art in a wide range of embodiments. Problems constantly occur in the art with the connecting technology in the area of the holder of the optical component, because the lenses being used have thermal expansion coefficients that differ significantly from those of the materials surrounding the optical component. As a result, even at the soldering stage or later at the preparatory stage, this causes tensions from temperature fluctuations between the components that can lead to rupturing of the lenses.

Patent DE 31 16 579 A1 discloses an optic holder with a two-part housing that is supported by single radial studs on the optical component, so that the two housing parts have different thermal expansion coefficients in order to produce a subtractive adjustment of the expansion differences. The disadvantage of this known optic holder is that, first, the sizing of the connecting stud, which depends on the thermal coefficients, is very complex and, second, the optical component is only held in the housing by studs set at a distance from one another, so that a holder of this kind is not appropriate for the holder of an optical component that is insulated against the surroundings.

SUMMARY OF THE INVENTION

Consequently it is the object of the invention to create a holder for optical components that is of simple construction and guarantees a low-tension, insulated framing of the optical component.

The solution of this object is characterized according to the invention in that a housing part is configured as the ring that surrounds the optical component and inside whose housing close to the optical component a groove is configured that surrounds the optical component and serves as a receptacle for the second housing part, configured as a tension or pressure ring.

Because of the inventive configuration of the two housing parts as the optical housing of a completely enclosing ring on the one hand, and on the other hand as a tension or pressure ring that is to be pressed into this ring, through the tensing of the two components, which have different thermal expansion coefficients, an expansion compensation is achieved. In addition the complete enclosure of the optical component by the ring-shaped housing part makes it possible to mount the optical component in the housing that is insulated against the surroundings.

To ensure, in case of a thermal expansion of the ring-shaped housing part surrounding the optical component, that only low-pressure forces can be exerted on the optical component, it is proposed with a practical embodiment of the invention that the groove should be positioned in the housing interior of the ring-shaped housing part and should be sized in such a way that the groove is separated from the optical component and from the housing exterior only by a thin-walled housing stud.

This thin-walled stud, according to the invention, advantageously forms a notch hinge, that is, an intentionally elastically malleable plying point in the basically one-piece ring-shaped housing part.

To configure the tension ring that is to be pressed into the groove, according to a first embodiment of the invention it is proposed that the tension/pressure ring should be configured as a massive tension ring with a lower thermal expansion coefficient than the ring that includes the groove.

According to a second embodiment of the invention it is proposed that the tension/pressure ring that is to be pressed into the groove should be configured as a toothed pressure ring with a greater thermal expansion coefficient than the ring that includes the groove, so that the toothed pressure ring advantageously is configured in the groove in such a way that the teeth point away from the optical component.

It is finally proposed with the invention that a soldering or cementing layer should be positioned as an insulating and fixing means between the optical component and the housing part forming a ring-shaped enclosure around the optical component.

Further properties and advantages of the invention can be seen from the appended illustration, in which two embodiments of an inventive holder for optical components are depicted in merely exemplary fashion, without restricting the invention to this example.

DETAILED DESCRIPTION OF THE INVENTION

Figure 1:
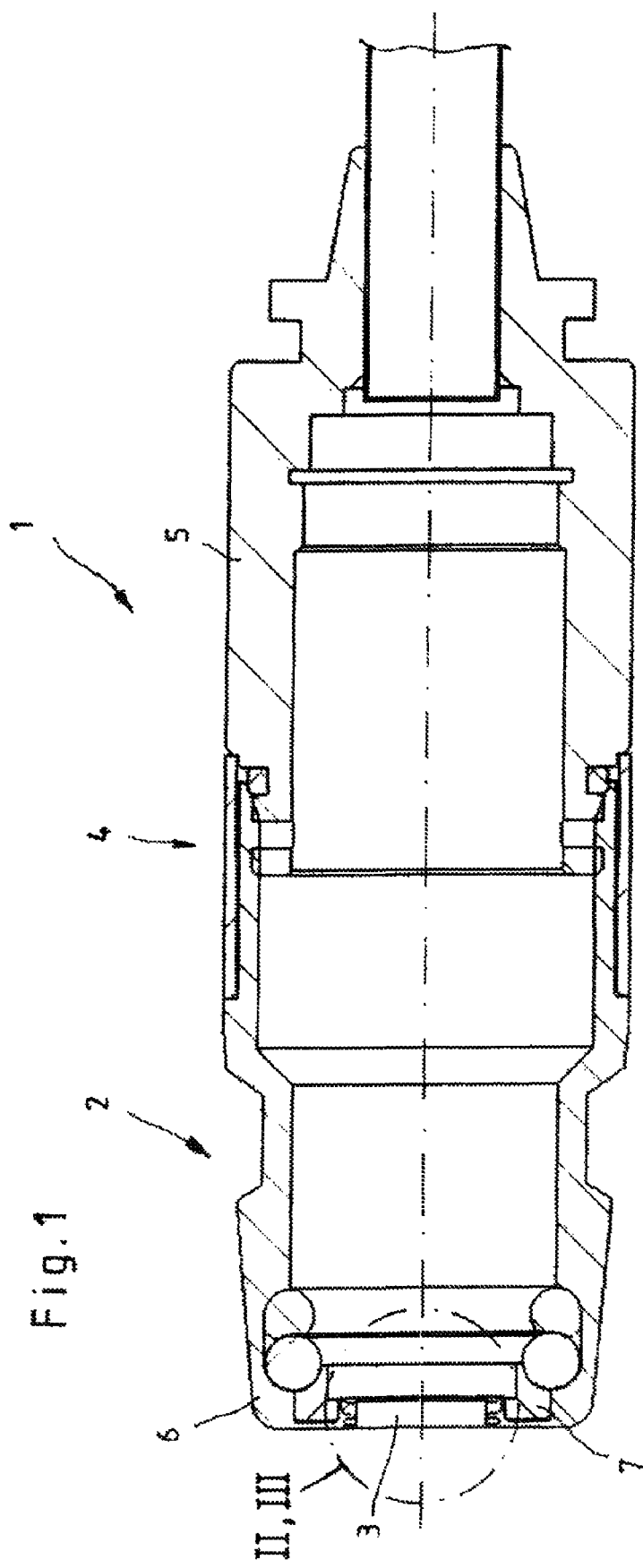
FIG. 1 shows a schematic sectional view of an optical instrument with an inventive holder for optical components.

The optical instrument 1 depicted schematically in FIG. 1 comprises on its distal end a holder 2 for an optical component 3 that is connected by a screw-in connection 4 with a housing 5 of the optical instrument 1. As can be seen further from FIG. 1, the holder 2 consists of two housing parts 6 and 7, whose structure can be seen from detail views in FIGS. 2 and 3.

Figure 2:
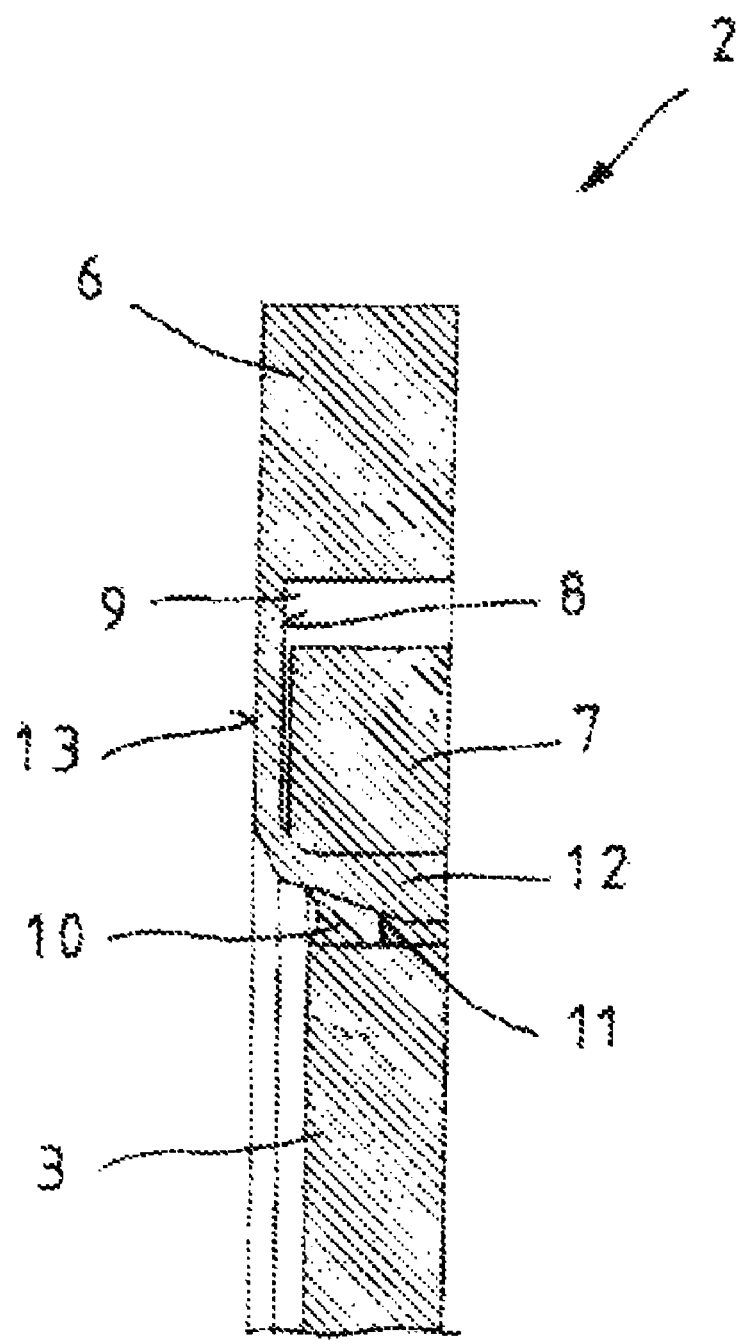
FIG. 2 shows an enlarged partial depiction of a first embodiment of detail II from FIG. 1.
Figure 3:
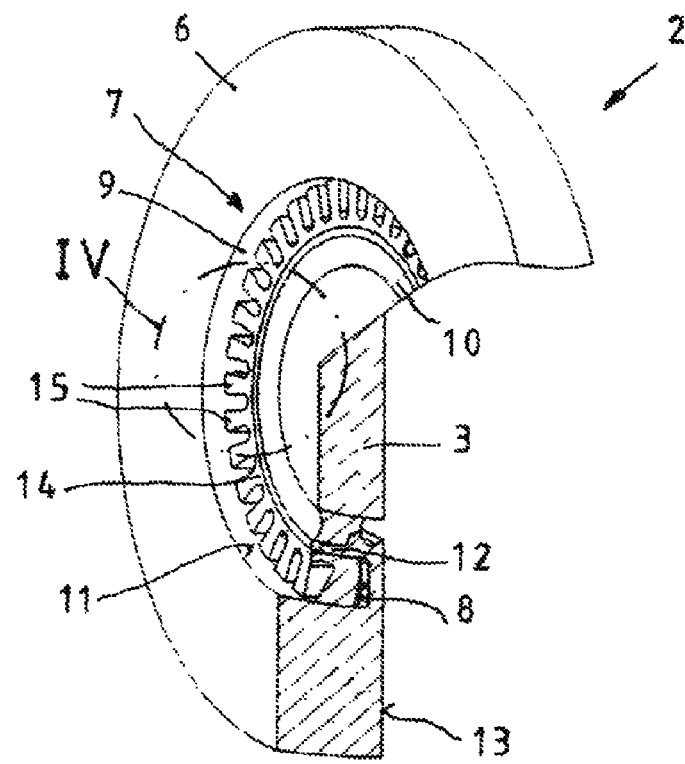
FIG. 3 shows an enlarged partial depiction of a second embodiment of detail III from FIG. 1, in partially cut-out perspective view.

As can be seen from FIGS. 2 and 3, a housing part 6 is configured as the ring 6 that encloses the optical component 3 and on whose housing interior 8, close to the optical component 3, a groove 9 is configured that surrounds the optical component 3 and that serves as a receptacle for the second housing part 7, which is configured as a tension or pressure ring 7.

In the optical instrument 1 shown in FIG. 1, the housing part 6 of the holder 2 that forms the ring 6 is simultaneously configured as a capsule-type ring housing 2.

As can further be seen from FIGS. 2 and 3, between the optical component 3 and the housing part 6 that forms a ring-shaped enclosure surrounding the optical component 3, there is configured as an insulating and fixing means a soldering or cementing layer 10, which insulates the holder 2 in the area of the optical component 3 against the environment.

FIG. 2 shows a first embodiment for configuring a low-tension enclosure of an optical component 3 in a holder housing 2. The ring 6, which completely surrounds the optical component 3 that is configured here as a plane lens, consists as a rule of a corrosion-resistant material. As a receptacle for the optical component 3, the ring 6 comprises a recess 11 that is adapted to the peripheral contour of the optical component and in which the optical component 3 can be secured for insulation by means of the soldering or cementing layer 10.

The groove 9 for inserting the tension/pressure ring 7 that forms the second housing part 7 of the holder 2 is positioned in the housing interior 8 of the housing part 6 configured as a ring 6 and sized in such a way that the groove 9 is separated from the optical component 3 and from the housing exterior 13 only by a thin-walled housing stud 12.

The ring 6 can be elastically reshaped by the thin-walled configuration of the housing stud 12 so that it is scarcely possible to transmit forces or tensions from the massive housing part 6 that lies radially beyond the groove 9 onto the housing stud 12 and onto the optical component 3 in the event of a thermal expansion of the ring 6.

The tension/pressure ring 7 that is pressed into the groove 9 is configured in this embodiment as a massive tension ring 7, which consists of a material with a lower thermal expansion coefficient than the material of the ring 6 that includes the groove 9.

If the ring 6 were heated without the pressed-in tension ring 7, the ring 6 would expand in such a way that the recess 11 for the optical component 3 would become larger, leading to tensions and fissures in the area of the soldering or cementing layer 10.

With the pressed-in tension ring 7, the thermal expansion behavior of the holder 2 changes, because the tension ring 7 barely expands and may even contract upon warming, because of its low, or even negative, thermal expansion coefficient. The pressed-in tension ring 7 thus prevents unhindered expansion of the ring 6. Because of the thin-walled expansion of the housing stud 12, the material of the housing stud 12 cannot summon enough pressure to expand the tension ring 7 strongly, resulting in merely a small change in size, if any, in the area of the enclosure of the optical component 3.

Because of the appropriate combination of the thickness ratios between the tension ring 7 on the one hand and the housing stud 12 on the other hand, the entire expansion of the enclosure of the optical component 3 can be regulated and adapted to the expansion of the optical component 3 and to the soldering or cementing layer 10.

Figure 4:
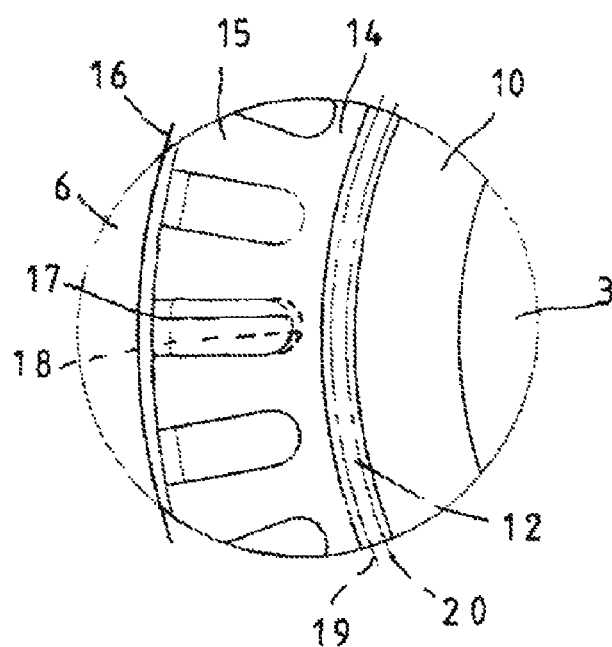
FIG. 4 shows an enlarged depiction of detail IV from FIG. 3.

FIGS. 3 and 4 show a second embodiment for configuring a low-tension enclosure for an optical component 3 in a holder housing 2. The ring 6, which entirely surrounds the optical component 3 configured here too as a plane lens, consists as a rule of a corrosion-resistant material. As a receptacle for the optical component 3, the ring 6 also includes a recess 11 that is adapted to the surrounding contour of the optical component 3 and in which the optical component 3 can be secured so that it is insulated by means of the soldering or cementing layer 10.

With this second embodiment too, the groove 9 for inserting the tension/pressure ring 7 that forms the second housing part 7 of the holder 2 is positioned in the housing interior 8 of the housing part 6 that is configured as a ring 6 and sized in such a way that the groove 9 is separated from the optical component 3 and from the housing exterior 13 only by a thin-walled housing stud 12.

The tension/pressure ring 7 pressed into the groove 9, in this second embodiment, is configured as a toothed pressure ring 14, which consists of a material with a greater thermal expansion coefficient than the material of the ring 6 that includes the groove 9. The toothed pressure ring 13 here is positioned in the grove 9 in such a way that teeth 15 of the toothed pressure ring 14 point away from the optical component 3.

As can be seen from FIGS. 3 and 4, the toothed pressure ring 14 with its outer diameter is contiguous with the radially outer wall of the groove 9. If this unit is heated, then the ring 6 expands until the radially outer wall of the groove 9 lies on the circular segment 16.

Because the toothed pressure ring 14 has a greater thermal expansion coefficient than the ring 6, it expands more strongly than the ring 6. The teeth 15 of the toothed pressure ring 14, which are supported on the ring and act as pressure profile, can extend only radially inward because the massive ring 6 prevents a greater expansion of the toothed pressure ring 14 going radially outward. With this radial inward expansion the contour on the base of the teeth 15 moves from position 17 in the direction toward position 18.

The radially inside wall of the thin-walled housing stud 12, which is contiguous with the soldering or cementing layer 10, would expand as far as the circle segment 19 without the toothed pressure ring 14. Because the teeth 15 of the toothed pressure ring 14, which act as a pressure profile, but which because of their thermal expansion exert a radially inward-directed pressure on the thin-walled housing stud 12, the inner wall of the thin-walled housing stud 12 expands only as far as the circle segment 20.

Thus a tensing of the ring 6 and of the pressure ring 14 occurs, in which the effects of thermal expansion and elastic reshaping are combined. With corresponding sizing and selection of active material, it is possible to force the thin-walled housing stud 12 to expand or retract upon changes in temperature precisely in the same or similar way as the optical component 3, so that tensions are avoided or at least strongly reduced.

What is claimed is:

1. A holder for optical components, with a holder housing, comprising two housing parts, that forms an essentially ring-shaped enclosure surrounding an optical component, whereby the two housing parts have different thermal expansion coefficients, characterized in that one housing part is configured as a ring that surrounds the optical component and serves as receptacle for the optical component and on whose housing interior close to the optical component a groove is configured that surrounds the optical component and serves as receptacle for the second housing part, which is configured as a tension or pressure ring.

2. A holder according to claim 1, wherein the groove is positioned in the inside of the housing of the ring-shaped housing part and sized in such a way that the groove is separated from the optical component and from a housing exterior only by a thin-walled housing stud.

3. A holder according to claim 2, wherein the thin-walled housing stud forms a notch hinge.

4. A holder according to claim 1, wherein the tension or pressure ring is to be pressed into the groove and is configured as a massive tension ring with a lower heat expansion coefficient than the ring that includes the groove.

5. A holder according to claim 1, wherein the tension or pressure ring is to be pressed into the groove and is configured as a toothed pressure ring with a greater thermal expansion coefficient that the ring that includes the groove.

6. A holder according to claim 5, wherein the toothed pressure ring is positioned in the groove in such a way that the teeth point away from the optical component.

7. A holder according to claim 1, wherein a soldering or cementing layer is positioned as an insulating and gripping means between the optical component and the housing part that forms a ring-shaped enclosure surrounding the optical component.

* * * * *